(12) United States Patent
Ortner et al.

(10) Patent No.: US 10,626,039 B2
(45) Date of Patent: Apr. 21, 2020

(54) SEPARATION OF TRANSPARENT WORKPIECES

(71) Applicant: SCHOTT AG, Mainz (DE)

(72) Inventors: Andreas Ortner, Gau-Algesheim (DE); Andreas Habeck, Undenheim (DE); Klaus Gerstner, Bischofsheim (DE); Georg Haselhorst, Schmitten (DE); Fabian Wagner, Mainz (DE)

(73) Assignee: SCHOTT AG, Mainz (DE)

( * ) Notice: Subject to any disclaimer, the term of this patent is extended or adjusted under 35 U.S.C. 154(b) by 499 days.

(21) Appl. No.: 14/711,881

(22) Filed: May 14, 2015

(65) Prior Publication Data

US 2016/0031745 A1 Feb. 4, 2016

Related U.S. Application Data

(63) Continuation of application No. PCT/EP2013/073329, filed on Nov. 8, 2013.
(Continued)

(51) Int. Cl.
*B23K 26/08* (2014.01)
*C03B 33/02* (2006.01)
(Continued)

(52) U.S. Cl.
CPC ...... *C03B 33/0222* (2013.01); *B23K 26/0624* (2015.10); *B23K 26/08* (2013.01);
(Continued)

(58) Field of Classification Search
CPC ... C03B 33/091; C03B 33/0222; C03B 33/04; C03B 33/033; C03B 33/03; C03B 33/037; C03B 33/093; C03B 33/102; B23K 26/40; B23K 26/0057; B23K 26/0624; B23K 26/0006; B23K 2201/40; B23K 2203/52; B23K 26/0869; B23K 26/073;
(Continued)

(56) References Cited

U.S. PATENT DOCUMENTS 6,327,875 B1 * 12/2001 Allaire ............... B23K 26/073
219/121.67
6,787,732 B1 * 9/2004 Xuan ................. B23K 26/0057
219/121.67
(Continued)

FOREIGN PATENT DOCUMENTS

DE 19963939 A1 7/2001
DE 10213044 B3 1/2004
(Continued)

OTHER PUBLICATIONS

English translation of International Preliminary Report on Patentability dated May 19, 2015 for corresponding PCT/EP2013/073329, 16 pages.
(Continued)

*Primary Examiner* — Jodi C Franklin
(74) *Attorney, Agent, or Firm* — Ohlandt, Greeley, Ruggiero & Perle, L.L.P.

(57) ABSTRACT

A method is provided for preparing transparent workpieces for separation. The method includes generating aligned filament formations extending transversely through the workpiece along an intended breaking line using ultra-short laser pulses.

13 Claims, 3 Drawing Sheets

Related U.S. Application Data

(60) Provisional application No. 61/726,065, filed on Nov. 14, 2012.

(51) Int. Cl.

| | | |
|---|---|---|
| *B28D 5/00* | (2006.01) | |
| *B23K 26/38* | (2014.01) | |
| *B23K 26/0622* | (2014.01) | |
| *B23K 26/40* | (2014.01) | |
| *B23K 26/364* | (2014.01) | |
| *B23K 26/12* | (2014.01) | |
| *B23K 26/14* | (2014.01) | |
| *B23K 26/402* | (2014.01) | |
| *B23K 26/53* | (2014.01) | |
| *B23K 103/00* | (2006.01) | |
| *B23K 101/18* | (2006.01) | |

(52) U.S. Cl.
CPC .......... *B23K 26/083* (2013.01); *B23K 26/123* (2013.01); *B23K 26/127* (2013.01); *B23K 26/14* (2013.01); *B23K 26/364* (2015.10); *B23K 26/38* (2013.01); *B23K 26/40* (2013.01); *B23K 26/402* (2013.01); *B23K 26/53* (2015.10); *B28D 5/0011* (2013.01); *B23K 2101/18* (2018.08); *B23K 2103/50* (2018.08); *B23K 2103/52* (2018.08); *B23K 2103/54* (2018.08)

(58) Field of Classification Search
CPC ............ B23K 26/0736; B23K 2203/54; B23K 2203/56; B23K 26/006; B23K 26/0648; B23K 26/53
See application file for complete search history.

(56) References Cited

U.S. PATENT DOCUMENTS

| | | | |
|---|---|---|---|
| 8,292,140 B2 | 10/2012 | Uh et al. | |
| 9,296,066 B2 * | 3/2016 | Hosseini | B23K 26/0057 |
| 2002/0006765 A1 * | 1/2002 | Michel | B23K 26/073 |
| | | | 451/28 |
| 2005/0127049 A1 | 6/2005 | Woeste et al. | |
| 2006/0086700 A1 | 4/2006 | Callies et al. | |
| 2006/0266195 A1 | 11/2006 | Hoetzel et al. | |
| 2007/0051706 A1 | 3/2007 | Bovatsek et al. | |
| 2009/0098710 A1 * | 4/2009 | Yamazaki | H01L 21/268 |
| | | | 438/458 |
| 2009/0117680 A1 * | 5/2009 | Yamazaki | H01L 21/76254 |
| | | | 438/57 |
| 2009/0170286 A1 * | 7/2009 | Tsukamoto | B23K 26/0075 |
| | | | 438/458 |
| 2010/0025387 A1 * | 2/2010 | Arai | B28D 5/00 |
| | | | 219/121.69 |
| 2010/0163540 A1 | 7/2010 | Vogel et al. | |
| 2010/0248451 A1 * | 9/2010 | Pirogovsky | B23K 26/38 |
| | | | 438/463 |
| 2010/0294748 A1 * | 11/2010 | Garner | C03B 33/0215 |
| | | | 219/121.72 |
| 2011/0049113 A1 * | 3/2011 | Glaesemann | C03B 33/091 |
| | | | 219/121.72 |
| 2011/0127242 A1 * | 6/2011 | Li | C03B 33/091 |
| | | | 219/121.69 |
| 2012/0000894 A1 * | 1/2012 | Abramov | B23K 26/0736 |
| | | | 219/121.72 |
| 2012/0009525 A1 * | 1/2012 | Clube | G03B 27/54 |
| | | | 430/322 |
| 2012/0047956 A1 * | 3/2012 | Li | C03B 33/091 |
| | | | 65/112 |
| 2012/0061440 A1 * | 3/2012 | Roell | C03B 33/033 |
| | | | 225/2 |
| 2012/0111310 A1 * | 5/2012 | Ryu | B23K 26/0057 |
| | | | 125/30.01 |
| 2012/0211923 A1 * | 8/2012 | Garner | C03B 33/04 |
| | | | 264/400 |

FOREIGN PATENT DOCUMENTS

| | | |
|---|---|---|
| DE | 102005024563 B3 | 8/2006 |
| DE | 102006042280 A1 | 6/2007 |
| DE | 102007028042 B3 | 8/2008 |
| JP | 2000263277 A | 9/2000 |
| JP | 2002059282 | 2/2002 |
| JP | 2003010989 | 1/2003 |
| JP | 2005021964 | 1/2005 |
| JP | 2006513036 | 4/2006 |
| JP | 2006239718 | 9/2006 |
| JP | 2009023194 A | 2/2009 |
| KR | 1020110019007 | 2/2011 |
| KR | 1020120058276 A | 6/2012 |
| WO | 2008126742 | 10/2008 |
| WO | 2012006736 A2 | 1/2012 |
| WO | 2012057823 A2 | 5/2012 |

OTHER PUBLICATIONS

International Search Report dated Jun. 12, 2014 for corresponding International Application No. PCT/EP2013/073329.
Written Opinion dated May 14, 2015 for corresponding International Application No. PCT/EP2013/073329.

* cited by examiner

SEPARATION OF TRANSPARENT WORKPIECES

CROSS REFERENCE TO RELATED APPLICATIONS

This application is a continuation of International Application No. PCT/EP2013/073329 filed Nov. 8, 2013, which claims the benefit of German Application No. 10 2012 110 971.0 filed Nov. 14, 2012 and claims the benefit of U.S. Provisional Application Ser. No. 61/726,065 filed Nov. 14, 2012, the entire contents of all of which are incorporated herein by reference.

BACKGROUND

1. Field of the Disclosure

The present invention relates to the preparation for separating workpieces and substrates using ultra-short pulsed laser radiation. In particular toughened glass or glass ceramics are contemplated as a workpiece material. The invention also relates to the separation of workpieces.

2. Description of Related Art

From WO 2012/006736 A2 it is known that the Kerr effect can be exploited to cause irreversible damages in glass in form of filaments. By generating a linear array of such damages in glass it is possible to separate transparent substrates. A filament is formed by an ultra-short laser pulse. Due to the Kerr effect, the laser beam experiences self-focusing in the interior of the glass until the energy density at a point becomes so high that a plasma is ignited. A plasma explosion is caused during which the glass undergoes irreversible damage around this plasma generation location. From there further radiation emanates which is subject to self-focusing and ends up in a plasma explosion. This effect is repeated several times, depending on the intensity. Energy decreases along the entire thickness of the glass, so the first plasma spots will have the highest energy and produce the greatest damages. Furthermore, the plasma spots are round, which means that emanating defects will occur randomly distributed in all directions.

In glass that exhibits introduced stresses, for example, chemically toughened glass, spontaneous self-breakage may occur whereby the processing of especially comparatively large glass sheets is considerably affected. As a result of breakage the position of the glass sheet changes. Further exact processing is impossible.

Patent document DE 102 13 044 B3 describes a method for cutting or drilling material. Here, again, the nonlinear optical effect occurring with high-intensity ultra-short laser pulses is exploited to produce a filament due to the alternating focusing and defocusing of the laser beam. Accordingly, a filament is a passage of small diameter produced by a high-intensity laser light beam.

Furthermore, document DE 10 2006 042 280 A1 describes a method for processing transparent material using a laser. Ultra-short laser pulses are used to generate both a surface groove on the substrate and one or more laser-modified regions in the volume of the material. The fracture ultimately leading to the separation occurs at the superficial scribing trace and propagates downwards across the substrate material. If the surface groove is too flat, the fracture tends to migrate. A generation of breaking edges with consistent high quality is not described.

DE 10 2007 028 042 B2 also discloses a method for laser processing of transparent materials and describes a use of pulsed laser radiation in the nanosecond range. The document mentions a range of radiation intensity in which material changes occur without plasma luminescence.

In summary, various processes have been known which allow to modify regions in the volume of a material by means of ultra-short pulsed laser radiation so as to provide one step of a separation process. However, the separating and breaking which is required for example for dicing substrates that have been modified in this manner, has hitherto not been sufficiently accessible to industrial processes. This problem is particularly acute with substrates comprising toughened glass or glass ceramics, as these are prone to uncontrolled breakage due to inherent stresses introduced by the toughening, when processed with ultra-short pulsed laser radiation.

However, for industrial application exact control is not only required for the generation of a separation line in or on the substrate, but also for the separating or breaking in order to produce breaking edges of consistent high quality and to ensure stability and safety of the process. This is very difficult particularly in case of toughened glass, since the material modifications caused by the laser irradiation can lead to an uncontrolled occurrence and propagation of cracks, so that accurate control of separation is very difficult.

The following issues are of concern: Cutting/Drilling using filamentation: due to the process, formation of the filament occurs inhomogeneously: due to the high initial energy density, comparatively larger plasma volumes are ignited on the entry side of the filament producing laser beam than at the subsequent plasma spots deeper in the workpiece, i.e. the channel of damages in the workpiece (corresponding to the filament formed) will taper. The induced damages (microcracks) will thus be much stronger on the entry side of the laser beam than on the exit side. Directional strength tests (four-point bending) reveal a significant difference in edge strength already with a glass thickness of 0.7 mm. Spatial geometry of the plasma generation spots: The plasma generation spots caused by self-focusing have a substantially spherically symmetrical shape with spherically symmetrical energy distribution, which causes direction-independent randomly distributed microcracks around the plasma volume. As a result, cracks will even protrude into the later breaking edge and have a strength-reducing effect. Spontaneous breakage: During filamentation of brittle materials with intrinsic stresses, uncontrolled spontaneous breakage of the workpiece occurs during the process, resulting in an increased rejection rate. Furthermore, spontaneous breakage causes a change in the position of the workpiece, so that automated processing is impeded or even made impossible.

SUMMARY

A major object of the invention is to improve the quality of the edges produced.

The invention permits to improve the separation process for hard and brittle materials.

Multifilamentation: In contrast to the prior art, the preparation of the separation by cleaving the workpiece is accomplished not only by generating a single tapering filament formation, but by generating a series of a plurality of consecutive filament formations. Each of these filament formations is comparatively narrow and produces a significantly lower number of microcracks transversely to the direction of the filament formations as compared to the separation process with a single filament formation that extends through the workpiece. Due to the less pronounced tapering of each single filament formation (=filament+microcracks) a better overall geometric accuracy of the processing channel is achieved, in combination with a higher edge strength of the breaking edge when the workpiece has been separated.

The individual filament formations are generated by a picosecond to femtosecond pulse train which is split and offset in time and introduced into the workpiece starting from the exit side of the laser beam. Larger cutting depths may be realized by multi-pulse sequences at the same laser power, with a corresponding reduction of the cutting speed.

The spatial geometric shape of the plasma may be influenced by a special optic system. The laser radiation beam is generated with an elongated cross-sectional shape, for example a lancet-shaped, elliptic, or drop-shaped cross section. In this manner, a controllable preferred direction of the damages/cracks resulting from the plasma explosions is obtained.

In case the intended breaking line is curved or changes direction, the laser radiation beam should be controlled in terms of directional alignment of its cross-sectional shape so that the longitudinal extension of the cross-sectional shape follows the intended separation line of the workpiece.

The generation of filament formations under a protective atmosphere is primarily an aspect of apparatus configuration, and the manufacturing apparatus is adapted so that the atmosphere surrounding the workpiece to be processed can be adjusted in a predefined manner.

With a selectively adjusted atmosphere it is possible to inhibit or prevent spontaneous breakage of the workpiece.

The invention also relates to a method for separating a substrate by means of focused laser radiation, comprising the steps of: exposing the substrate to a protective gas atmosphere; directing ultra-short pulsed laser radiation onto the substrate, the substrate being transparent in the wavelength range of the laser radiation; generating a filamentary material modification in depth in a predetermined volume of the substrate by the laser irradiation; and breaking the substrate along the separation line defined by the material modification.

There are two nonlinear optical effects that may be caused by an ultra-short pulsed laser radiation in a transparent material, which is the optical Kerr effect on the one hand, and on the other the defocusing of the laser beam in a plasma bubble. Such effects have already been known and will therefore be outlined only briefly.

The Kerr effect refers to a change in the optical property of a transparent material (transparent in the range of wavelengths of the laser radiation) as a function of the applied or occurring strength of the electric field. The laser radiation involves an electric field in the transparent material whose strength depends on the light intensity of the laser radiation. The electric field causes a change in the optical characteristics of the irradiated material, including an increase in refractive index. This in turn leads to the self-focusing of the laser radiation.

Due to the self-focusing and the resulting reduction of the irradiated cross-sectional area, power density per unit area and hence radiation intensity strongly increases and may reach very high values. As a result, the electric field is further intensified leading to multiphoton ionization. Ionization means charge separation in molecules or atoms and plasma formation at focusing spots. Anyway damage is caused in the material of the substrate in the focusing spots, which will also be referred to as a material modification below and manifests itself as plasma bubbles.

In the region of the locally generated plasma bubble defocusing of the laser beam occurs, which is again followed by a next focusing of the laser beam. In this manner, a kind of pearl string can be produced in the material of the substrate, which consists of a series of multiple consecutively aligned focusing and defocussing regions and which are referred to as filaments.

Due to the focusing and defocusing, the laser beam may be caused to propagate into the material of the substrate so that the material is subjected to a kind of perforation in depth. This effect has been known from the processing of transparent materials such as glass and is used, for example, to produce a kind of perforation line in the substrate as an intended breaking line or separation line, by moving the substrate relative to the laser radiation.

With a higher laser power, a correspondingly deeper perforation may be achieved, which facilitates separation in the region of the perforation.

However, an application of deeper perforation poses problems in conjunction with pre-stressed glass, that is to say a material which exhibits increased inherent stress already in the starting state. The elevated inherent stress may result in spontaneously formation and propagation of cracks in the perforated regions, as described in WO 2012/006736 A2, inter alia. In particular with a comparatively high laser power, breakage of the substrate may occur already during the processing. Therefore, industrial application is considerably complicated because the separation process cannot be reliably managed and controlled.

The inventors have found that the spontaneous cracking can be reduced or even completely prevented if during laser irradiation of the substrate, the workpiece is exposed to a specific atmosphere. For example, cracking is significantly reduced or delayed if a protective gas atmosphere is prevailing during the laser irradiation, which is poor in hydroxyl (OH) ions or even free of OH ions.

By applying a nitrogen atmosphere during the laser irradiation, the period of time until spontaneous breaking cracks occurred in the region of the perforation was sufficiently extended.

In this way it is possible to conclude with the process of laser irradiation of the substrate before spontaneous breaking cracks occur in the substrate so that the substrate breaks. Accordingly, during irradiation with ultra-short pulsed laser radiation the substrate is exposed to an atmosphere that is low in OH ions or free of OH ions. For example an appropriately gas-tight chamber can be used for this purpose, in which the substrate is accommodated during the laser irradiation.

Particularly good experiences were made with a protective gas atmosphere including a water content of less than 0.2 vol %, preferably less than 0.1 vol %.

Thus, the laser irradiation enables to generate a filamentary material modification in depth similar to a perforation in a predetermined volume of the substrate. The predetermined volume of the substrate refers to the predefined separation area along which the perforation is to be produced and which therefore defines the later separation area or separation line on the surface of the substrate.

Particularly advantageously, the substrate or the laser beam may be moved relative to one another in order to enable the perforation in the depth of the substrate along the separation line in this way. Typically, the substrate may be moved, for example by means of an X-Y axes adjustment assembly which allows two-dimensional displacement of the substrate with a constant distance to the laser radiation. This arrangement may additionally be combined with a movable Z-axis arrangement in order to enable adjustment of the distance between the substrate and the laser beam.

The substrate material is optically transparent at least in the range of wavelengths of the laser radiation, with an optical transmittance in this range of at least 80%/cm, preferably at least 85%/cm, and most preferably at least 90%/cm. Thus, the laser radiation can penetrate into the material.

The substrate may comprise materials selected from a group comprising glass, sapphire, and diamond. Surprisingly, the laser irradiation according to the invention can even be employed for toughened glass as known for display applications, for example, and also with sheet glass. Furthermore surprisingly, glass ceramic materials can also be processed.

The perforation in depth produced in the substrate along a path extends along the separation line at which a separation of the substrate is intended to occur. The separation line may be a rectilinear line, but also a non-straight or curved line. For example, the separation line may have very small radii to enable a separation of the material similar to a drilled hole.

The perforation may extend from the surface of the substrate vertically into the depth. However, it may likewise be produced at a certain angle with respect to the surface, for example to produce oblique separation edges at the substrate. In this case the laser beam is not directed perpendicularly but rather at a predetermined angle to the surface of the substrate.

Subsequently, separation of the material is accomplished along the perforated separation line. For this purpose it is necessary that the material modification which is generated by the perforation and is equivalent to a damage of the material reaches a particular extent in order to enable separation with a specific surface quality of the separation edge and strength of the separated substrate.

It has been found that the separation at the separation line is well done when the perforation extends into a depth corresponding to at least 40% of the material thickness of the substrate, preferably at least 50%, and most preferably at least 55%. In this case the filaments should have a spacing to each other ranging from about 200 μm to 800 μm. A filament may have a cross section in a range from about 15 μm to 250 μm.

In this manner, a sufficiently extensive pre-damage of the substrate material may be achieved along the separation line resulting in good separability. When separating the material along the separation line, separation edges are formed with a surprisingly good quality of the so produced separation edges.

In the region of perforation, the separation edges typically exhibit a pattern of adjacent parallel filaments, and in the underlying region of the separation edge a rather conchoidal fracture pattern. Roughness values obtained for the separation edge were in a range of Ra<100 μm.

The separation edges produced moreover exhibit high level edge strength. This was determined by a 4-point bending test. The average strength value achieved was at least 120 MPa in case of toughened glass.

The laser source is selected according to the range of wavelengths in which the substrate is transparent. The wavelength range of the emitted radiation is within the transmission range of the substrate.

The laser beam may be spatially focused with a Gaussian intensity distribution in order to achieve a sufficiently high intensity. The first focal point is located within the substrate, that is to say in the substrate volume. When the laser pulse hits this point in the volume of the substrate, a plasma may be generated and hence a material modification may be produced there. With the subsequent defocusing and further focusing effects, the filamentary perforation comprising a plurality of focusing points can be produced in the substrate volume.

The focusing spots in transparent glass, for example, often have a spherical approximately symmetric shape. However, by means of a special optic system it was possible to generate focusing points of non-spherical spatial shape in toughened glass. For example, elliptic, lancet-shaped, or drop-shaped focusing spots were generated. Such shapes of the focusing spots promote a formation of cracks in particular from one focusing spot to the next due to a better propagation of the crack, thus also improving the quality of the separation edge that can be achieved.

A suitable laser source according to the present invention operates with a repetition rate between 10 kHz and 120 kHz, preferably between 30 kHz and 110 kHz, and most preferably between 35 kHz and 105 kHz.

An appropriate pulse duration of a laser pulse is in a range below 100 picoseconds, preferably less than 10 picoseconds, and most preferably less than 1 picosecond. Particularly favorably, the laser source is operated at a power in a range from about 7 to 12 watts.

With such a laser radiation, very good results were obtained for the generation of separation lines on toughened glass and perforated in depth.

An increase of the laser power may lead to a greater tendency to spontaneous formation of cracks, in particular in toughened glass, whereas in non-toughened glass it is possible to achieve a more dense perforation which in turn improves separability.

The invention further relates to an apparatus for separating a substrate, in particular toughened glass or glass ceramic, by means of focused laser radiation, comprising: a gas-tight chamber for accommodating the substrate; an ultra-short pulsed laser light source; means for displacing the substrate and/or the laser light source relative to each other, while: the substrate is exposed to a protective gas atmosphere; ultra-short pulsed laser radiation is directed onto the substrate, which substrate is transparent in the wavelength range of the laser radiation; by the laser irradiation, a filamentary material modification is generated in a predetermined volume and extending into the depth of the substrate; separation is accomplished along the separation line defined by the material modification.

The invention further relates to an article of toughened glass or glass ceramic that has been processed at least on one side by a method according to the invention.

In a modification of the method for separating a substrate, in particular toughened glass or glass ceramic, by means of focused laser radiation, the substrate is exposed to a second atmosphere following the perforation of the substrate along the later separation line. This second atmosphere is different from the protective gas atmosphere which accordingly represents the first atmosphere, in its content of hydroxyl (OH) ions. The second atmosphere has a higher content of OH ions than the first atmosphere.

The inventors have found that an increased content of OH ions can promote the separation or cleaving of the workpiece along the perforated separation line. By exposition to an atmosphere enriched in OH ions, such as wet steam, a formation of cracks may be promoted and thus controlled. In this way, the process step of cleaving for accomplishing material separation can be selectively influenced, so that easy industrial applicability is provided. In particular it is possible to prevent spontaneous breaking cracks from occurring.

Particularly good experiences have been made with a second atmosphere having an OH ions content of at least 1.4 vol %, preferably at least 2 vol %.

Therefore, particularly advantageously, the chamber for accommodating the substrate may be gas-tight so that a first atmosphere poor in OH ions is easily established. Furthermore particularly advantageously, this chamber may as well be adapted for exposing the substrate to an OH ion enriched atmosphere. But it is likewise possible that the apparatus comprises two separate chambers which are adapted accordingly for applying the first or the second atmosphere.

Further details of the invention will become apparent from the description of the illustrated exemplary embodiments and the appended claims.

BRIEF DESCRIPTION OF THE DRAWINGS

Exemplary embodiments of the invention will now be described with reference to the drawings, wherein.

DETAILED DESCRIPTION

Figure 1:
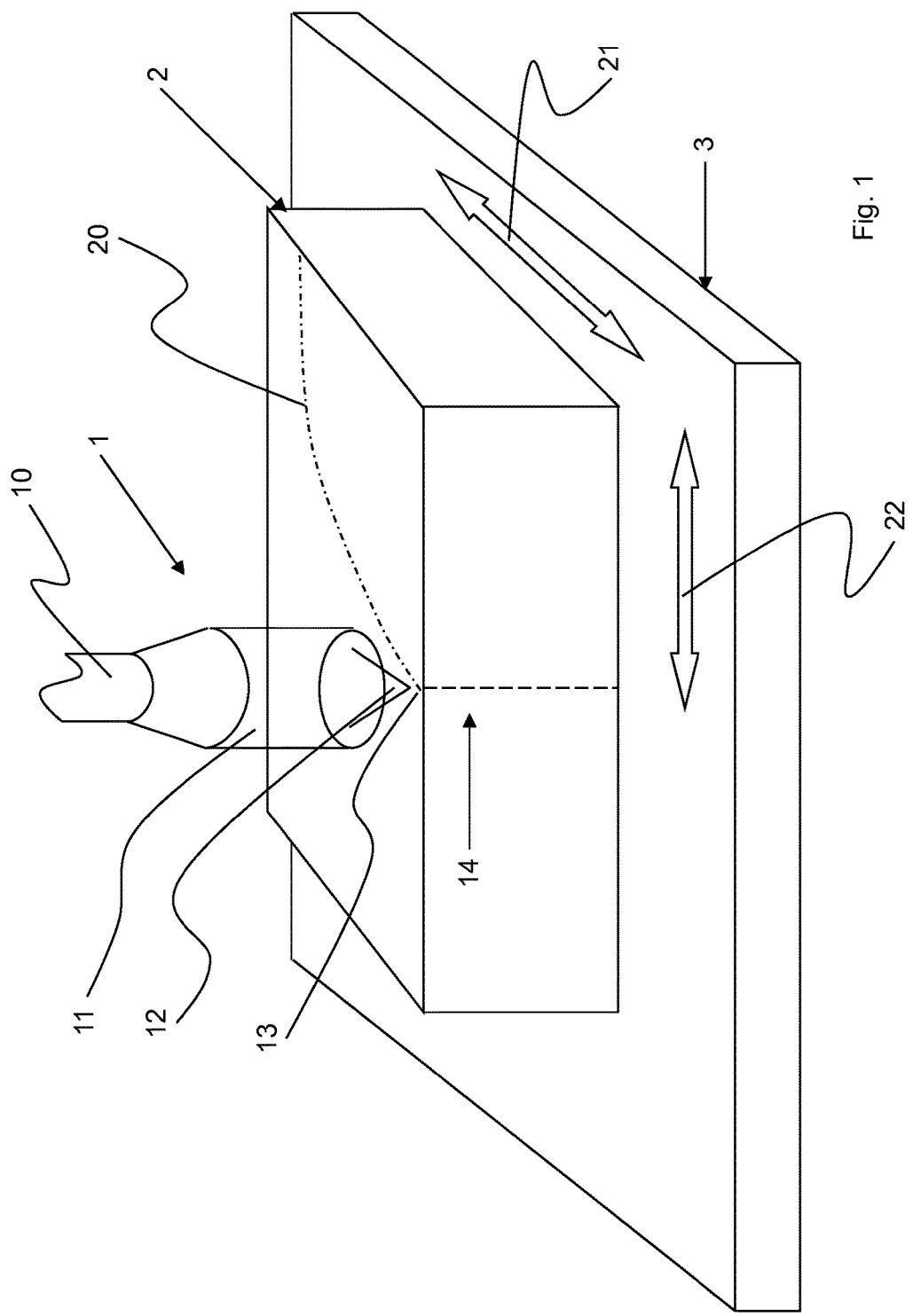
FIG. 1 shows a laser processing device while processing a workpiece on a workpiece table.

FIG. 1 shows a laser processing device 1 above a workpiece 2 resting on a workpiece table 3. The laser processing device comprises an ultra-short pulsed laser 10 and a focusing optic system 11 to provide a focused radiation beam 12 having a focal point 13 near the upper surface of the workpiece 2. A cut line or breaking line 20 is indicated on workpiece 2, along which line the workpiece is to be separated or cleaved. Provisions are made so that the focus 13 can be displaced along this line 20, which is facilitated by adjusting the table in the two coordinate directions 21, 22. Very small adjustment increments are used.

The ultra-short pulsed laser 10 is able to deliver laser pulse trains in two or more successive periods. The wavelength of the radiation is chosen so as to be in a range for which the workpiece 2 is transparent. The energy of the laser pulses is dimensioned so that in each case a respective line-shaped damage formation 14 is formed transversely to the surface of workpiece 2. By displacing the focusing optic system 11 along the intended breaking line 20, a series of line-shaped damage formations 14 is generated in the workpiece 2, which virtually define the intended breaking face. The invention relates to the generation of this series of line-shaped damage formations 14 along the line 20.

Figure 2:
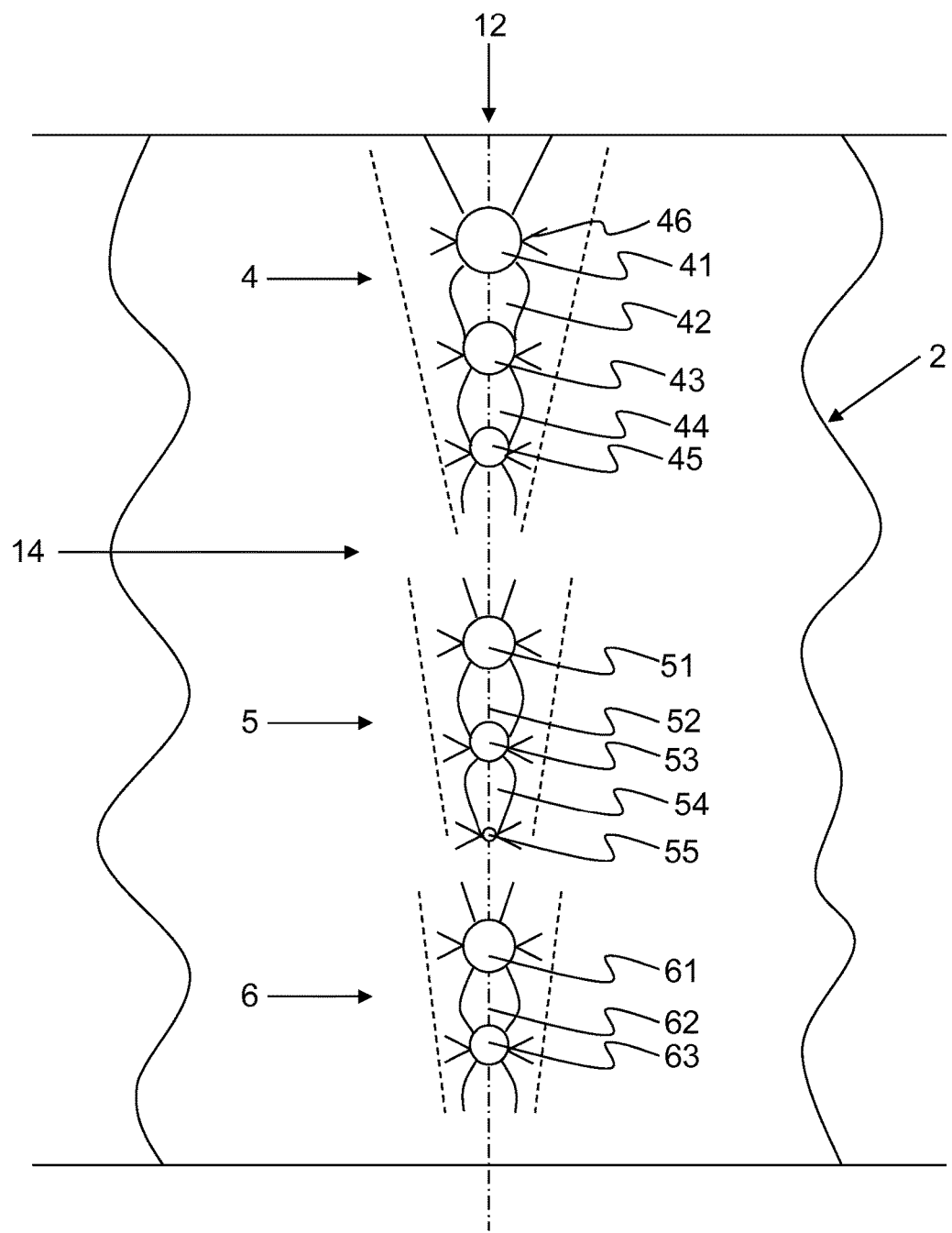
FIG. 2 shows an enlarged detail of FIG. 1.

FIG. 2 schematically shows a damage formation 14 extending transversely through the workpiece 2. In the illustrated exemplary embodiment, the damage formation 14 comprises three filament formations 4, 5, and 6 aligned along a straight line. Each of these filament formations is generated by an ultra-short pulsed laser pulse train. In case of filament formation 4, a plasma spot 41 is generated due to self-focusing of the laser beam 12, at which plasma spot the material of the workpiece transitions into the plasma phase, which is accompanied by emitted radiation 42 which due to self-focusing leads to a further plasma spot 43, and the process continues until the energy of the laser pulse is exhausted. A virtual plasma explosion takes place at plasma generation spots 41, 43, 45, due to thermal expansion, which causes cracks forming mainly along a gap that is created into the interior of the workpiece, which is desirable, but also transversely to this channel, as indicated by cracks 46. These transverse cracks 46 are undesirable and are intended to be kept as small as possible with the invention.

For this purpose, the damage formation 14 is created in several stages. This is achieved by emitting the laser pulses in two or more successive periods. The energy of the laser pulses during one period is chosen to be so small that only a few small plasma explosion spots are produced during one emission period. In this way, a formation of detrimental lateral cracks 46 is significantly reduced. Along filament formation 4 gaps and cleaving cracks are formed which predefine the later fracture in the workpiece.

In a second laser pulse period, filament formation 5 is generated similarly as filament formation 4. Plasma bubbles 51, 53, 55 and defocusing-focusing spots 52, 54 are produced; similarly as with plasma bubbles 61, 63 and defocusing-focusing spots 62 during the third laser pulse period. The greater depth approach is successful due to the previously formed gaps and cleaving cracks in the direction of the breaking point which virtually presents a guiding channel for the second and subsequent laser pulse periods. The number of successive laser pulse periods is determined according to the thickness of workpiece 2.

Figure 3:
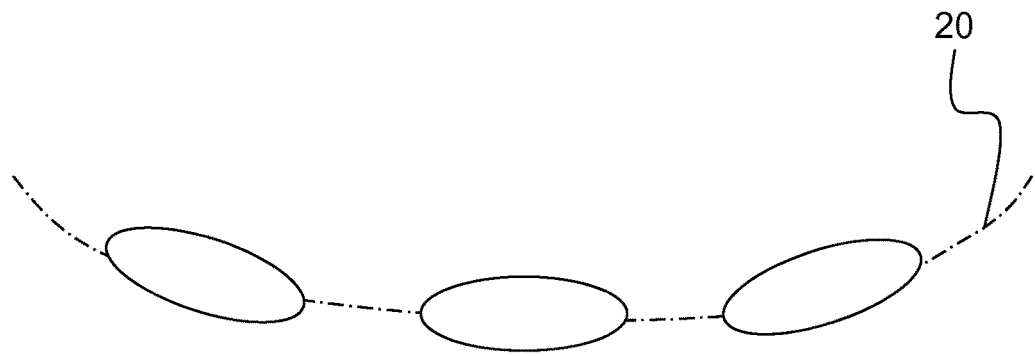
FIG. 3 shows an elliptical beam cross section of the laser processing device.
Figure 4:
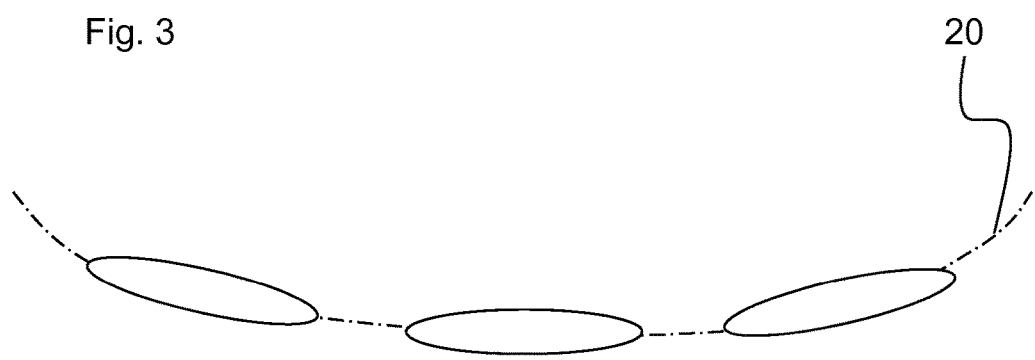
FIG. 4 shows lancet-shaped beam cross sections.
Figure 5:
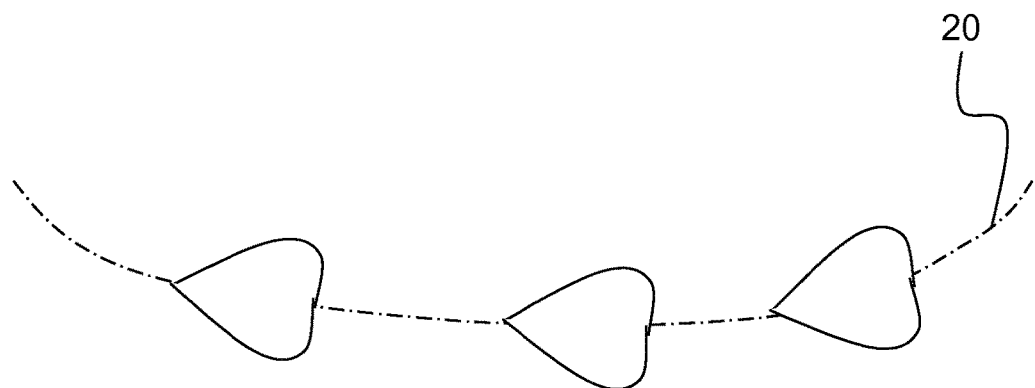
FIG. 5 shows drop-shaped beam cross sections.

To promote a formation of gaps in the direction of breaking face 20 it is useful to choose cross-sectional shapes of the laser beam which are elongated or have a larger dimension in the intended breaking direction. Such cross-sectional shapes are illustrated in FIGS. 3, 4, and 5. The elliptical cross-sectional shape may be obtained based on an originally circular cross-sectional shape of the laser beam by combining cylindrical lenses. The lancet-like shape of FIG. 4 and the drop shape of FIG. 5 of the beam cross section can be obtained by special lenses. These shapes promote cleaving cracks and gaps in the direction of the intended breaking line 20.

If, as illustrated, the breaking line is desired to be curved, the laser radiation beam has to be controlled accordingly so that the larger cross-sectional dimension is continuously aligned along the intended breaking direction.

When processing brittle material, there is a risk that the workpiece spontaneously breaks when the damage formations along the intended breaking line 20 have not yet been all completed. In order to minimize or completely avoid this risk, the processing is performed in a "neutral" atmosphere, such as under nitrogen. In this manner, prepared workpieces are obtained which are prepared for being separated or cleaved. The final separation or cleaving is then performed by subjecting the workpiece to a mechanical tension, and under water vapor or in another atmosphere containing hydroxyl (OH) groups.

It should be noted that the finer the fracture pattern in the separation plane is desired to be obtained, the smaller the spacings are chosen between the locations of damage formations 14 along line 20. The spacings are of the same order of magnitude as the diameter of the damage formations.

What is claimed is:

1. A method for generating a series of line-shaped damage formations in a transparent workpiece along a line, comprising:

providing a laser processing device including an ultra-short pulsed laser and a focusing optic system, the laser processing device illuminating laser radiation with a wavelength that is within a transmission range of the workpiece;

providing a workpiece table and a displacement device for directing the focusing optic system onto the workpiece during generation of the damage formations and incrementally displacing the focusing optic system and the workpiece table relative to each other according to the line; and emitting, while the focusing optic system is directed to each location of the damage formations, laser pulses in two or more successive periods at the workpiece while the workpiece is exposed to a protective gas atmosphere, wherein the laser pulses have an energy during each period that is dimensioned so that a corresponding filament formation is produced in the workpiece, and wherein the successive periods produce consecutively aligned filament formations extending transversely through the workpiece.

2. The method as claimed in claim 1, wherein each filament formation comprises a plurality of focusing and defocusing points aligned transversely to the workpiece like a string of pearls.

3. The method as claimed in claim 1, wherein the increments of displacement of the focusing optic system relative to the workpiece are in the order of magnitude of the lateral dimension of the filament formations along the series of damage formations.

4. The method as claimed in claim 1, wherein the number of successive periods at each location of damage formation is a function of a local thickness of the workpiece.

5. The method as claimed in claim 1, wherein the focusing optic system generates a radiation beam having a cross-sectional shape with a larger dimension in a direction along the line of locations of line-shaped damage formations than transverse to the direction.

6. The method as claimed in claim 5, wherein the focusing optic system is adjustable with respect to the larger cross-sectional dimension of the radiation beam, so that alignment of the larger cross-sectional dimension is adjusted to follow the line of damage formations.

7. The method as claimed in claim 1, wherein during the generation of the series of line-shaped damage formations, the workpiece is exposed to the protective gas atmosphere to prevent premature fracture along the line of locations of the damage formations.

8. The method as claimed in claim 1, further comprising exposing the damage formations to a gas that includes a content of hydroxyl (OH) ions to promote the separating and cleaving of the workpiece along the line.

9. The method as claimed in claim 8, further comprising breaking the workpiece along the line.

10. The method as claimed in claim 1, wherein the protective gas atmosphere comprises nitrogen.

11. The method as claimed in claim 1, wherein the protective gas atmosphere is free of OH ions.

12. The method as claimed in claim 1, wherein the protective gas atmosphere has a water content of less than 0.2 vol %.

13. The method as claimed in claim 1, wherein the protective gas atmosphere has a water content of less than 0.1 vol %.

* * * * *